(12) United States Patent
Eaton et al.

(10) Patent No.: US 8,260,343 B2
(45) Date of Patent: *Sep. 4, 2012

(54) ELECTRONIC DEVICES INCLUDING VERTICALLY MOUNTED LOUDSPEAKERS AND RELATED ASSEMBLIES AND METHODS

(75) Inventors: William Chris Eaton, Cary, NC (US); Randolph Cary Demuynck, Wake Forest, NC (US); Kok Eng Looi, Penang (MY)

(73) Assignee: Sony Ericsson Mobile Communications AB, Lund (SE)

( * ) Notice: Subject to any disclaimer, the term of this patent is extended or adjusted under 35 U.S.C. 154(b) by 568 days.

This patent is subject to a terminal disclaimer.

(21) Appl. No.: 12/332,774

(22) Filed: Dec. 11, 2008

(65) Prior Publication Data

US 2010/0111350 A1    May 6, 2010

Related U.S. Application Data

(63) Continuation-in-part of application No. 12/265,965, filed on Nov. 6, 2008.

(51) Int. Cl.
 *H04M 1/00* (2006.01)
 *H04M 9/00* (2006.01)
 *H04R 25/00* (2006.01)
 *H04R 1/20* (2006.01)
 *H04R 1/02* (2006.01)
 *H04R 1/00* (2006.01)

(52) U.S. Cl. ............... 455/550.1; 379/419; 379/420.01; 379/420.02; 379/388; 379/432; 381/152; 381/431; 381/351; 381/345; 381/386

(58) Field of Classification Search ............ 379/420.02, 379/432, 433.02; 381/152, 345, 351, 386, 381/431; 455/550.1
See application file for complete search history.

(56) References Cited

U.S. PATENT DOCUMENTS 6,411,719 B1 *  6/2002  Moster et al. ................ 381/345
(Continued)

FOREIGN PATENT DOCUMENTS

EP    1 942 699    7/2008
(Continued)

OTHER PUBLICATIONS

Final Office Action from United States Patent and Trademark Office Corresponding to U.S. Appl. No. 12/265,965; Mail Date: Sep. 26, 2011; 21 pages.
JL Audio, Engineered Lead-Wire System, Aug. 14, 2007, http://web.archive.org/web/20110103223443/http://mobile.jlaudio.com/products_subs_pages.php?page_id=63.

(Continued)

*Primary Examiner* — Kent Chang
*Assistant Examiner* — Nathan Brittingham
(74) *Attorney, Agent, or Firm* — Myers Bigel Sibley & Sajovec (57) ABSTRACT

An electronic device may include a printed circuit board and a speaker box defining an acoustic volume between spaced apart first and second speaker box walls with the first speaker box wall being between the second speaker box wall and the printed circuit board. A loudspeaker may be coupled to the first speaker box wall, and the loudspeaker may include an acoustic actuator that is configured to generate displacements in response to an electrical signal applied thereto. The loudspeaker may further include a speaker membrane that is mechanically coupled to the acoustic actuator and that is configured to deflect in directions toward and away from the second speaker box wall responsive to displacements of the acoustic actuator. Related assemblies and methods are also discussed.

12 Claims, 4 Drawing Sheets

U.S. PATENT DOCUMENTS

| | | | |
|---|---|---|---|
| 7,050,578 | B1 | 5/2006 | Watanabe |
| 7,536,207 | B2 * | 5/2009 | Son .................. 455/569.1 |
| 2002/0064292 | A1 * | 5/2002 | Rombach et al. .......... 381/324 |
| 2003/0205238 | A1 | 11/2003 | Bran |
| 2004/0036656 | A1 | 2/2004 | Neverman |
| 2004/0202338 | A1 * | 10/2004 | Longbotttom et al. ....... 381/190 |
| 2004/0204024 | A1 * | 10/2004 | Voth et al. ............... 455/550.1 |
| 2004/0240698 | A1 | 12/2004 | Eaton |
| 2005/0129264 | A1 * | 6/2005 | Mitsuishi .................. 381/396 |
| 2006/0038733 | A1 * | 2/2006 | Wedel et al. ............... 343/795 |
| 2006/0061535 | A1 * | 3/2006 | Kim et al. ................... 345/98 |
| 2007/0010302 | A1 | 1/2007 | Timms |
| 2007/0049326 | A1 * | 3/2007 | Kim ........................ 455/550.1 |
| 2007/0116321 | A1 | 5/2007 | Jang et al. |
| 2007/0280497 | A1 | 12/2007 | Isberg et al. |
| 2010/0150389 | A1 * | 6/2010 | Sumiyama et al. ........... 381/386 |

FOREIGN PATENT DOCUMENTS

| | | |
|---|---|---|
| JP | 2006 019980 | 1/2006 |

OTHER PUBLICATIONS

Non-Final Office Action from United States Patent and Trademark Office Corresponding to U.S. Appl. No. 12/265,965; Mail Date: Mar. 30, 2011; 19 pages.

Notification of Transmittal of the International Preliminary Report on Patentability; International Preliminary Report on Patentability corresponding to International Application No. PCT/US2009/003124; Date of mailing: Feb. 17, 2011; 17 pages.

International Preliminary Report and Written Opinion (8 pages) corresponding to International Application No. PCT/US2009/0033050; Mailing Date: May 19, 2011.

International Search Report and Written Opinion (15 pages) corresponding to International Application No. PCT/US2009/003124; Mailing Date: Aug. 25, 2009.

International Search Report and Written Opinion (14 pages) corresponding to International Application No. PCT/US2009/003050; Mailing Date: Aug. 17, 2009.

\* cited by examiner

ELECTRONIC DEVICES INCLUDING VERTICALLY MOUNTED LOUDSPEAKERS AND RELATED ASSEMBLIES AND METHODS

RELATED APPLICATION

The present application claims the benefit of priority as a Continuation-In-Part (CIP) of U.S. application Ser. No. 12/265,965 entitled "Electronic Devices Including Substrate Mounted Acoustic Actuators and Related Methods and Mobile Radiotelephones" and filed on Nov. 6, 2008, the disclosure of which is hereby incorporated herein in its entirety by reference.

FIELD OF THE INVENTION

The present invention relates to the field of electronics, and more particularly, to electronic devices including speakers and related methods.

BACKGROUND

Many portable electronic devices (such as cellular radiotelephones, global positioning systems, etc.) use one or more loudspeakers to provide audio information, and sizes of these electronic devices continue to shrink. A loudspeaker(s) in a cellular radiotelephone (separate from an ear speaker), for example, may be used to provide an incoming call alert (such as a ring tone) and/or to provide speakerphone operations. As sizes of electronic devices shrink, space available for a loudspeaker(s) may also shrink, but smaller loudspeakers may provide reduced performance. In particular, it may be difficult to provide suitable loudspeaker performance if an acoustic back volume and/or an area of a speaker membrane is reduced too much.

SUMMARY

According to some embodiments of the present invention, an electronic device may include a printed circuit board, a speaker box, and a loudspeaker. The speaker box may define an acoustic volume between spaced apart first and second speaker box walls, with the first speaker box wall being between the second speaker box wall and the printed circuit board. The loudspeaker may be coupled to the first speaker box wall, and the loudspeaker may include an acoustic actuator that is configured to generate displacements in response to an electrical signal applied thereto. The loudspeaker may further include a speaker membrane that is mechanically coupled to the acoustic actuator and that is configured to deflect in directions toward and away from the second speaker box wall responsive to displacements of the acoustic actuator.

The acoustic actuator and the loudspeaker membrane may be provided in the speaker box between the first and second speaker box walls. The speaker box may include an electrical coupling therethrough between the acoustic actuator and the printed circuit board so that the acoustic actuator is configured to generate displacements in response to the electrical signal that is provided from the printed circuit board through the electrical coupling to the acoustic actuator.

A wireless transmitter and/or receiver may be configured to transmit and/or receive wireless communications from a remote electronic device, and a controller may be electrically coupled to the transmitter and/or receiver. The controller may be configured to process the communications transmitted to and/or received from the remote electronic device. An antenna may be electrically coupled to the wireless transmitter and/or receiver, and the antenna may extend along the second speaker box wall so that the acoustic volume is between portions of the antenna and the first speaker box wall. More particularly, the wireless transmitter and/or receiver may include a wireless transceiver configured to transmit and receive radiotelephone communications. In addition, a housing may define first and second ends and may enclose the printed circuit board, the speaker box, the loudspeaker, the wireless transceiver, the controller, and the antenna, and the speaker box and the antenna may be adjacent the first end of the housing. A microphone may be adjacent the first end of the housing and may be electrically coupled to the controller with the microphone being configured to convert sound into an electrical signal to be processed by the controller and transmitted by the transceiver. Moreover, the microphone may be acoustically coupled to a first opening through the housing. A speaker may be adjacent the second end of the housing and may be electrically coupled to the controller with the speaker being configured to convert an electrical signal from the controller into sound. Moreover, the speaker may be acoustically coupled to a second opening through the housing.

The acoustic volume may include a first acoustic volume between the loudspeaker membrane and the second speaker box wall. The loudspeaker may further include an enclosure defining a second acoustic volume between the loudspeaker membrane and the first speaker box wall so that the loudspeaker membrane is between the first and second acoustic volumes. The enclosure may define a port coupled to the second acoustic volume with the port being configured to transmit sound generated by the loudspeaker. In addition, a housing may enclose the printed circuit board, the speaker box, and the loudspeaker, and the port may be acoustically coupled to an opening through the housing. The first speaker box wall may be oriented in a direction that is substantially perpendicular with respect to a major surface of the printed circuit board, and the loudspeaker membrane may be configured to deflect in a direction along an axis that is substantially parallel with respect to the major surface of the printed circuit board.

According to other embodiments of the present invention, a speaker assembly for an electronic device may include a speaker box, a loudspeaker, and an antenna. The speaker box may define an acoustic volume between spaced apart first and second speaker box walls. The loudspeaker may be coupled to the first speaker box wall with the loudspeaker including a speaker membrane configured to deflect in directions toward and away from the second speaker box wall. The antenna may be on the second speaker box wall so that the acoustic volume is between the antenna and the first speaker box wall.

The loudspeaker may include an acoustic actuator that is configured to generate displacements in response to an electrical signal applied thereto, and the speaker membrane may be mechanically coupled to the acoustic actuator so that the speaker membrane is configured to deflect in the directions toward and away from the second speaker box wall responsive to displacements of the acoustic actuator. The acoustic actuator and the loudspeaker membrane may be provided in the speaker box between the first and second speaker box walls. Moreover, the speaker box may include an electrical coupling therethrough wherein the electrical coupling is configured to provide an electrical coupling between the acoustic actuator and a controller outside the speaker box assembly.

The acoustic volume may be a first acoustic volume between the loudspeaker membrane and the second speaker box wall. The loudspeaker may further include an enclosure defining a second acoustic volume between the loudspeaker membrane and the first speaker box wall so that the loudspeaker membrane is between the first and second acoustic volumes. Moreover, the enclosure may define a port coupled to the second acoustic volume with the port being configured to transmit sound generated by the loudspeaker.

According to still other embodiments of the present invention, a method of assembling an electronic device may include providing a speaker assembly including a speaker box and a loudspeaker. The speaker box may define an acoustic volume between spaced apart first and second speaker box walls. The loudspeaker may be coupled to the first speaker box wall with the loudspeaker including a speaker membrane configured to deflect in directions toward and away from the second speaker box wall. After providing the speaker assembly including the speaker box and the loudspeaker, the speaker assembly may be assembled in a housing together with a printed circuit board so that the first speaker box wall is between the second speaker box wall and the printed circuit board.

The loudspeaker may include an acoustic actuator that is configured to generate displacements in response to an electrical signal applied thereto, and the acoustic actuator may be mechanically coupled to the speaker membrane so that displacements of the actuator result in deflections of the speaker membrane in the directions toward and away from the second speaker box wall. Providing the speaker assembly may further include providing an antenna on the second speaker box wall so that the acoustic volume is between the antenna and the first speaker box wall.

The acoustic actuator and the loudspeaker membrane may be provided in the speaker box between the first and second speaker box walls. The speaker box may also include an electrical coupling therethrough configured to provide an electrical coupling between the acoustic actuator and the printed circuit board so that the acoustic actuator is configured to generate displacements in response to the electrical signal that is provided from the printed circuit board through the electrical coupling to the acoustic actuator.

The acoustic volume may include a first acoustic volume between the loudspeaker membrane and the second speaker box wall. The loudspeaker may further include an enclosure defining a second acoustic volume between the loudspeaker membrane and the first speaker box wall so that the loudspeaker membrane is between the first and second acoustic volumes. The enclosure may define a port coupled to the second acoustic volume, the port may be configured to transmit sound generated by the loudspeaker, and the housing may have an opening therethrough acoustically coupled with the port. After assembling the speaker assembly in the housing, the first speaker box wall may be oriented in a direction that is substantially perpendicular with respect to a major surface of the printed circuit board so that the loudspeaker membrane is configured to deflect in a direction along an axis that is substantially parallel with respect to the major surface of the printed circuit board.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. Moreover, dimensions (e.g., lengths, widths, heights, thicknesses, etc.) of elements shown in the figures may not be drawn to scale, and may instead be exaggerated for clarity.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described below with reference to block diagrams. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of wireless communication terminals for purposes of illustration and explanation only, the present invention is not limited thereto. It is to be understood that the present invention can be more broadly used in any sort of electronic device including an acoustic speaker therein.

It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present invention.

Figure 1:
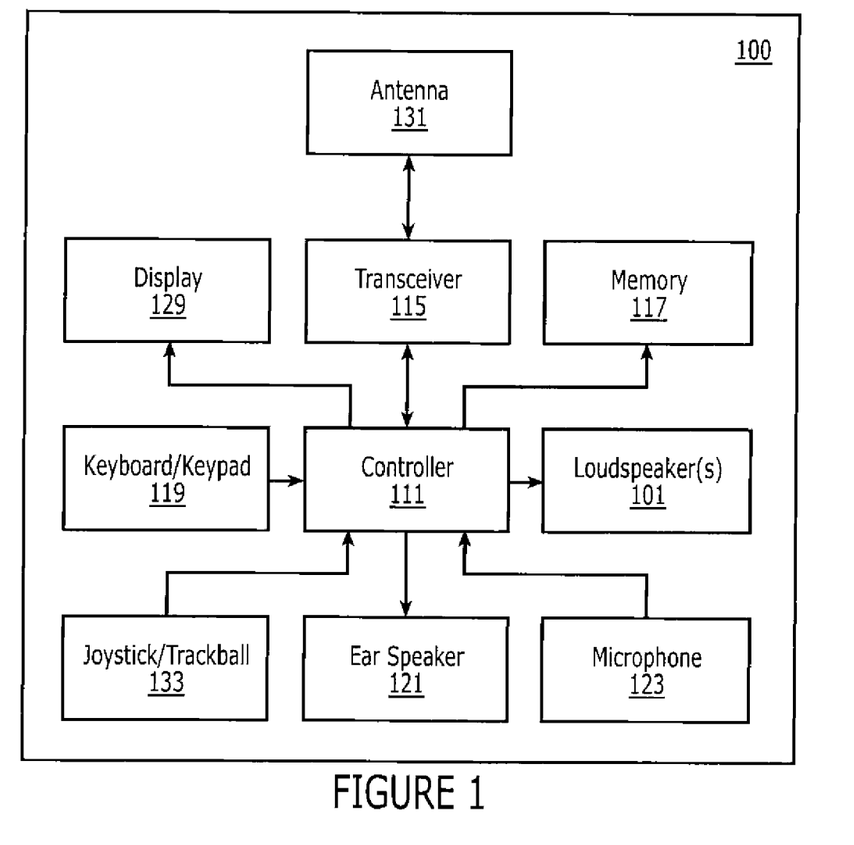
FIG. 1 is a block diagram of an electronic device including loudspeaker(s) according to some embodiments of the present invention.

FIG. 1 is a block diagram of an electronic device 100 including loudspeaker(s) 101 according to some embodiments of the present invention. Electronic device 100, for example, may be a wireless communications device (such as a cellular radiotelephone), a Personal Digital Assistant (PDA), an audio/picture/video player/recorder, a global positioning (GPS) unit, a gaming device, or any other electronic device including loudspeaker(s) 101. Electronic device 100 may also include controller 111 coupled to loudspeaker(s) 101, coupled to radio transceiver 115 (including a transmitter and a receiver), coupled to memory 117, and coupled to display 129 (such as an LCD screen). In addition, keyboard/keypad 119, joystick/trackball 133, ear speaker 121, and/or microphone 123 may be coupled to controller 111. Moreover, transceiver 115 may be coupled to antenna 131. As discussed herein, electronic device 100 may be a cellular radiotelephone configured to provide PDA functionality, data network connectivity (such as Internet browsing), and/or other data functionality.

The controller 111 may be configured to communicate through transceiver 115 and antenna 131 over a wireless air interface with one or more RF transceiver base stations and/or other wireless communication devices using one or more wireless communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, Universal Mobile Telecommunications System (UMTS), WiMAX, and/or HIPERMAN, wireless local area network (e.g., 802.11), and/or Bluetooth. Controller 111 may be configured to carry out wireless communications functionality, such as conventional cellular phone functionality including, but not limited to, voice/video telephone calls and/or data messaging such as text/picture/video messaging.

The controller 111 may be further configured to provide various user applications which can include a music/picture/video recorder/player application, an e-mail/messaging application, a calendar/appointment application, and/or other user applications. The audio/picture/video recorder/player application can be configured to record and playback audio, digital pictures, and/or video that are captured by a sensor (e.g., microphone 123 and/or a camera) within electronic device 100, downloaded into electronic device 100 via radio transceiver 115 and controller 111, downloaded into electronic device 100 via a wired connection (e.g., via USB), and/or installed within electronic device 100 such as through a removable memory media. An e-mail/messaging application may be configured to allow a user to generate e-mail/messages (e.g., short messaging services messages and/or instant messages) for transmission via controller 111 and transceiver 115. A calendar/appointment application may provide a calendar and task schedule that can be viewed and edited by a user to schedule appointments and other tasks. Moreover, functionalities of display 129, keyboard/keypad 119, joystick/trackball 133, and/or other user interface elements may be combined, for example, using a touch sensitive display screen.

Elements of controller 11, transceiver 115, and/or memory 117 may be implemented, for example, using one or more integrated circuit semiconductor devices mounted on and electrically coupled to one or more printed circuit boards included within a housing. Moreover, controller 111 and/or elements thereof may be electrically coupled to display 129, keyboard/keypad 119, joystick/trackball 133, ear speaker 121, microphone 123, loudspeaker 101, memory 117, and/or transceiver 115 through electrically conductive paths (e.g., conductive traces and/or vias) provided on/in such a printed circuit board(s). While controller 111, transceiver 115, and memory 117 are illustrated as separate blocks by way of example, functionalities thereof may be combined and/or further subdivided. For example, a single transceiver block may be defined to perform functionalities of transceiver 115, controller 111, and memory 117, or a single controller block may be defined to perform functionalities of transceiver 115, controller 111, and memory 117.

Figure 2A:
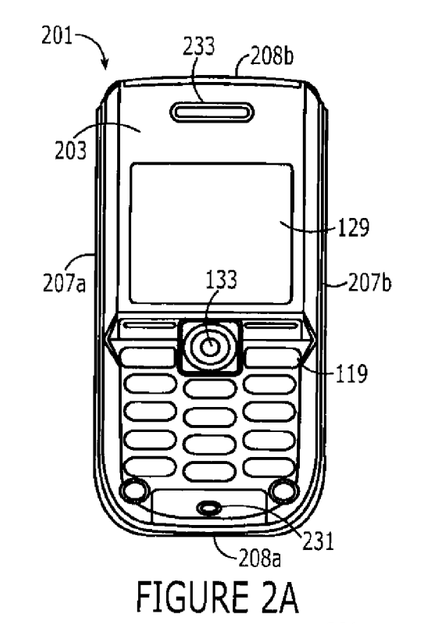
FIGS. 2A, 2B, and 2C are front side, back side, and edge views of an electronic device according to some embodiments of the present invention.
Figure 2B:
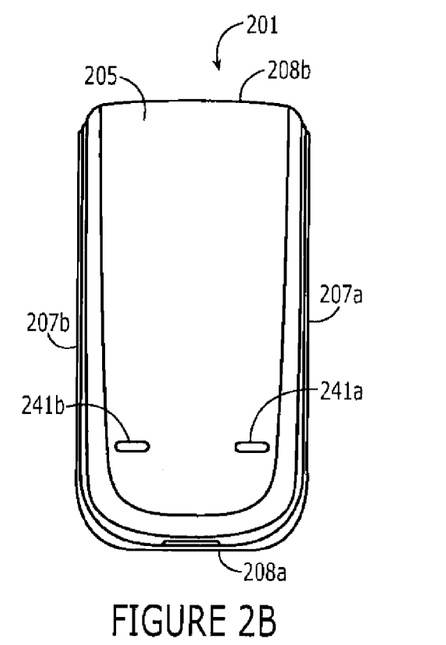
Figure 2C:
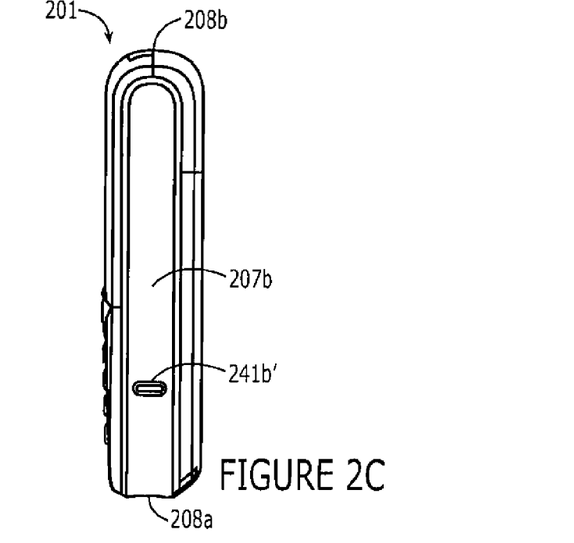

Internal elements of electronic device 100 may be enclosed in housing 201 illustrated in FIGS. 2A, 2B, and 2C, while other elements may be provided outside and/or may be visible through housing 201. As shown in FIGS. 2A, 2B, and 2C, housing 201 of electronic device 100 may include front side 203, back side 205, edges 207a-b, and ends 208a-b. While edge 207a is not shown in a separate figure, edge 207a may be a mirror image of edge 207b shown in FIG. 2C. Transceiver 115, controller 111, ear speaker 121, microphone 123, loudspeaker(s) 101, memory 117, and antenna 131 may be enclosed inside housing 201. Display 129 may be provided on and/or visible through front side 203 of housing 201, and keyboard/keypad 119 and joystick/trackball 133 may be accessible on front side 203 of housing 201.

As further shown in FIG. 2A, microphone opening 231 through front side 203 of housing 201 may be acoustically coupled to microphone 123 enclosed in housing 201 adjacent end 208a. Similarly, ear speaker opening 233 through front side 203 of housing 201 may be acoustically coupled to ear speaker 121 enclosed in housing 201 adjacent end 208a, Accordingly a user of electronic device 100 may hold ear speaker opening 233 to the user's ear during a radiotelephone conversation while electronic device 100 is oriented to extend from the user's ear in a direction canted slightly away from the user's head with the microphone opening 213 generally oriented toward the user's mouth. Accordingly, end 208a of housing 201 adjacent microphone 231 may be oriented most distant from the user's head during a radiotelephone conversation, and antenna 131 may thus be provided adjacent end 208a of housing 201 adjacent microphone opening 231 to reduce radio frequency (RF) shielding from the user's head during the radiotelephone conversation.

As shown in FIG. 2B, loudspeaker openings 241a and 241b may be provided though back side 205 of housing 201, and loudspeaker openings 241a and 241b may be acoustically coupled to loudspeakers 101 enclosed within housing 201. While two loudspeaker openings 241a and 241b coupled to respective loudspeakers are discussed (e.g., to provide stereo, dual mono, etc.) by way of example, a single loudspeaker (and a single opening) may be provided, or three or more loudspeakers (and respective openings) may be provided. For example, two speakers may be used to provide sufficient loudness and/or sound quality. Loudspeakers 101, for example, may be used to provide an alert for an incoming call (e.g., to broadcast a ring tone), to provide a loudspeaker for speaker phone operations, to play audio content (e.g., to play music), etc. In other words, ear speaker 121 may be provided for use adjacent a user's ear, while loudspeakers 101 may be provided for use remote from a user's ear.

Spaced apart loudspeaker openings 241 a-b are shown on back side 205 of housing 201 by way of example, but other arrangements may be provided. In addition and/or in an alternative, loudspeaker openings may be provided on an edge or edges of housing 201, on end 208a of housing 201, and/or on front side 203 of housing 201. As shown in FIG. 2C, for example, loudspeaker opening 241b' may be provided on edge 207b, and a corresponding loudspeaker opening may be provided on edge 207a (not shown). By providing spacing between loudspeaker openings (for example, on opposite sides of back side 205 or on opposite edges 207a and 207b), a stereo effect may be increased. By providing the loudspeakers 101 and antenna 131 adjacent a same end of housing 201, an empty space used to provide acoustic back volumes for loudspeakers 101 may also be used to increase an antenna volume separating antenna 131 from other conductive elements of the electronic device.

Figure 3A:
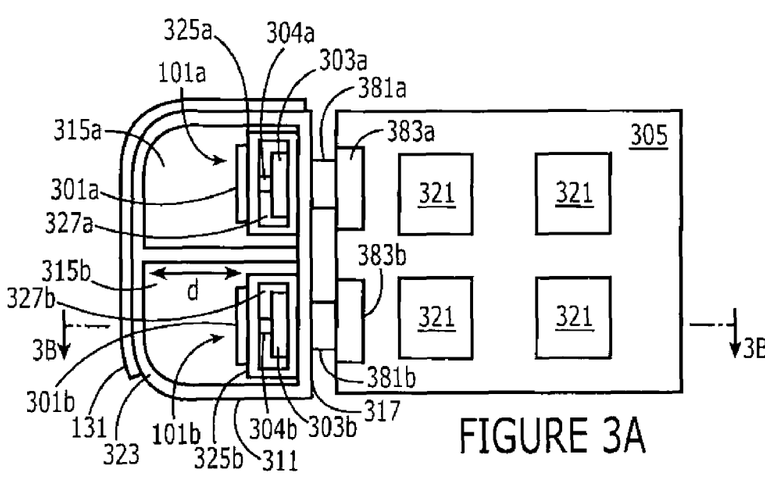
FIGS. 3A and 3B are respective plan and cross sectional views of structures used to provide loudspeakers according to some embodiments of the present invention.
Figure 3B:
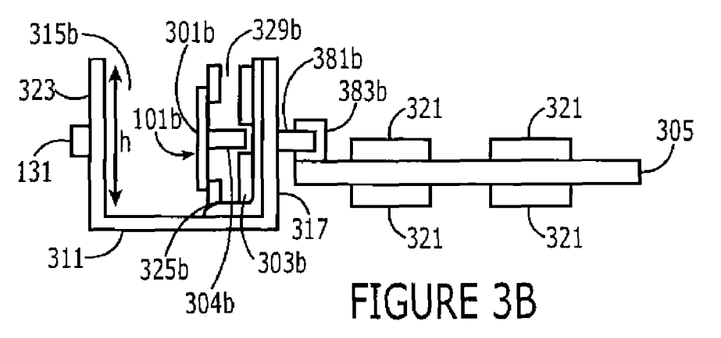

Interior structures used to provide loudspeakers 101 inside housing 201 are illustrated in FIGS. 3A and 3B. A speaker assembly 371, for example, may include a speaker box 311 defining acoustic back volumes 315a-b, and loudspeakers 101a-b in the respective back volumes 315a-b. Each of loudspeakers 101a-b may include a speaker membrane 301a-b driven by a respective acoustic actuator including a stationary permanent magnet 303 a-b and a movable coil 304a-b housed in an enclosure 325a-b. Moreover, speaker box 311 may include an electrical coupling therethrough between movable coils 304a-b and printed circuit board PCB 305. As shown in FIGS. 3A and 3B by way of example, speaker box 311 may include male connectors 381a-b that are configured to provide electrical coupling with female connectors 383a-b of printed circuit board 305. An electrical coupling between controller 111 and movable coils 304a-b may thus be provided through electrically conductive paths on/in PCB 305, through female connectors 383a-b, through male connectors 381a-b, through loudspeaker enclosures 325a-b, and along speaker membranes 301a-b to coils 304a-b. Coils 304a-b of each acoustic actuator may thus be configured to generate displacements along a direction parallel with respect to the surface of the PCB 305 in response to an electrical signal applied thereto. By mechanically coupling coils 304a-b of acoustic actuators with respective speaker membranes 301 a-b, the speaker membranes 301 a-b may be configured to deflect responsive to displacements generated by respective coils 304a-b. Accordingly, speaker membranes 301a-b may be configured to deflect with respective coils 304a-b in a direction along an axis that is substantially parallel with respect to a major surface of printed circuit board 305.

Speaker box 311 may thus define separate acoustic back volumes 315a-b adjacent respective speaker membranes 301 a-b. In addition, speaker box 311 may include a first speaker box wall 317 on which loudspeakers 101 a-b are mounted. Accordingly, speaker membranes 301 a-b may be oriented in a plane that is substantially parallel with respect to speaker box wall 317 and that is substantially perpendicular with respect to PCB 305. Portions of second speaker box wall 323 may be spaced apart from first speaker box wall 317 so that acoustic back volumes 315a and 315b are defined between first and second speaker box walls 317 and 323. In addition, antenna 131 or portions thereof may be provided on second speaker box wall 323 so that acoustic back volume 315a and/or 315b separate antenna 131 (or portions thereof) from loudspeakers 101a-b, PCB 305, and/or other electrically conductive elements of the electronic device. Antenna 131 may be provided, for example, using a flexible conductive material that is bonded to speaker box wall 323. While antenna 131 is shown by way of example outside speaker box 311, antenna 131 or portions thereof may be provided on an inside surface of speaker box wall 323 according to other embodiments of the present invention. By using a same empty space to provide acoustic back volumes and to provide antenna volume and by providing loudspeakers 101a-b (including electrically conducive coils 304a-b and permanent magnets 303a-b) on speaker box wall 317 most distant from antenna 131, performance of both loudspeakers 101 a-b and antenna 131 may be improved. Moreover, electrical coupling between antenna 131 and transceiver 131 may be provided through male connector 381a or 381b, through corresponding female connector 383a or 383b, and through electrically conducive paths on/in printed circuit board 305.

The speaker assembly (including speaker box 311, loudspeakers 101a-b, antenna 131, and male connectors 381a-b) may be assembled separate from housing 201 and PCB 305, and then assembled with PCB 305 inside housing 201. According to some embodiments of the present invention, speaker box 311 including walls 317 and 323, male connectors 381a-b, and an open side may be formed separately from housing 201 (for example, using injection molding), and then prefabricated loudspeakers 101a-b may be mounted inside speaker box 311. A separately fabricated portion of speaker box 311 may then be secured to an open portion of speaker box 311 (shown at the top of FIG. 3B) to close the speaker box 311 before assembling with housing 201 and PCB 305. According to other embodiments of the present invention, a portion of speaker box 311 may remain open until enclosed within housing 201, and a portion of housing 201 may be used to close the speaker box 311.

PCB 305 may have a plurality of integrated circuit semiconductor devices 321 mechanically mounted on and electrically coupled to PCB 305. More particularly, elements of controller 111, transceiver 115, and/or memory 117 (discussed above with respect to FIG. 1) may be implemented using one or more of integrated circuit semiconductor devices 321 and/or discrete electronic devices mounted on and electrically coupled to printed circuit board 305. Moreover, controller 111 and/or elements thereof may be electrically coupled to display 129, keyboard/keypad 119, joystick/trackball 133, ear speaker 121, microphone 123, loudspeaker 101, memory 117, and/or transceiver 115 through electrically conductive paths (e.g., conductive traces and/or vias) provided on/in PCB 305.

As noted above, each loudspeaker 101a-b may include a respective enclosure 325a-b. More particularly, each enclosure 325a-b may define a respective acoustic front volume 327a-b so that each speaker membrane 301a-b is between respective acoustic front and back volumes 327a-b and 315a-b. In addition, each enclosure 325a-b may define a port 329a-b configured to transmit sound generated by the respective loudspeaker 101a-b. After assembling the electronic device so that speaker box 311, PCB 305, actuators 303a-b, and enclosures 325a-b are enclosed inside housing 201, ports 329a-b of enclosures 325a-b may be acoustically coupled with respective openings 241a-b through housing 201 (shown in FIG. 2B).

As shown in FIGS. 3A and 3B, ports 329a-b may be provided to generate sound in a direction perpendicular with respect to PCB 305 to mate with openings through back side 205 of housing 201 according to some embodiments of the present invention. According to other embodiments of the present invention, ports 329a-b may be provided to generate sound in a direction parallel with respect to PCB 305 to mate with openings through edges 207a-b of housing 201. According to still other embodiments of the present invention, ports 329a-b may be acoustically coupled to ducts provided in/through speaker box 311 to acoustically couple acoustic front volumes 327a-b with openings through front side 203 of housing 201, through back side 205 of housing, through end 208a of housing 201, through edges 207a-b of housing 201, etc.

By using speaker box 311 to provide both acoustic back volumes and an antenna volume (separating antenna 131 from other metallic components such as electrical components, shield cans, screws, loudspeaker coils, loudspeaker magnets, etc.), improved antenna radio frequency (RF) performance and improved loudspeaker acoustic performance may be provided in a relatively small volume. Antenna RF performance may be improved by providing the loudspeaker assembly (including acoustic actuators) on speaker box wall 317 most distant from antenna 131. Moreover, a size and shape of speaker box 311 may be more easily customized by a manufacturer of the electronic device to provide a greater flexibility of an overall design of the electronic device in which the loudspeaker is being used. For example, a distance d (shown in FIG. 3A) separating antenna 131 and loudspeakers 101a-b) may be in the range of about 8 mm to 12 mm, and a height h of speaker box (shown in FIG. 3B) may be in the range of about 6 mm to 8 mm. According to some embodiments of the present invention, a same speaker box assembly (including speaker box 311, loudspeakers 101a-b, antenna 131, and male connectors 381a-b) may be provided for multiple product lines (e.g., radiotelephone product lines) thereby reducing a cost of developing new products (e.g., new radiotelephones). Accordingly, product development times/costs may be reduced without sacrificing antenna performance, loudspeaker performance, or volume.

Figure 4A:
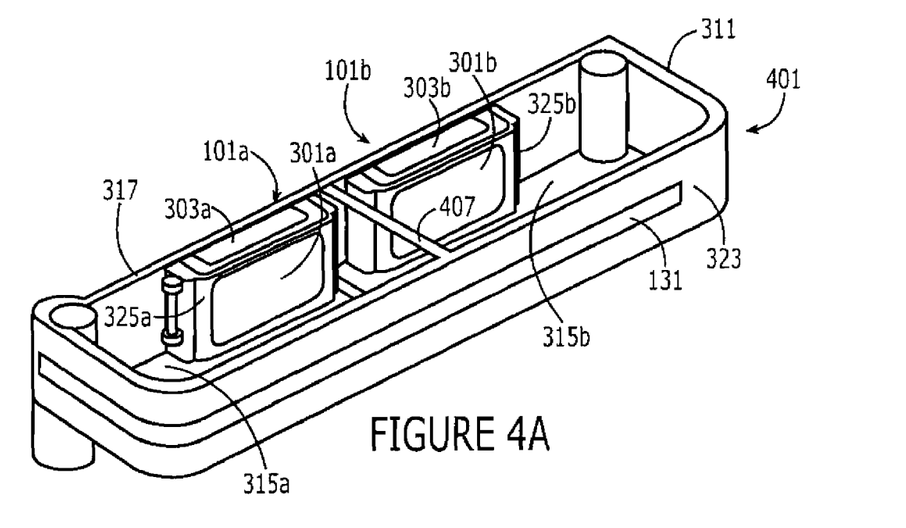
FIGS. 4A and 4B are plan views of closed and open speaker box assemblies according to some embodiments of the present invention.
Figure 4B:
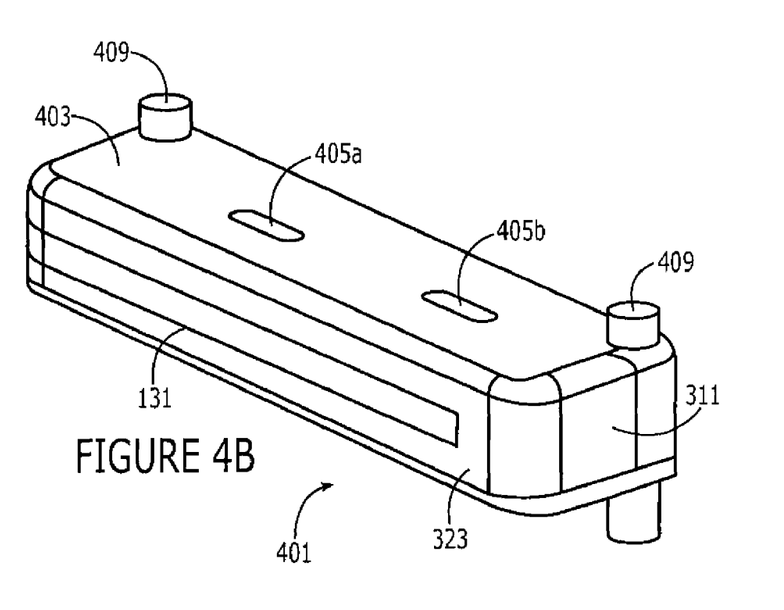

FIG. 4A is a plan view of an open speaker box assembly corresponding to the speaker box assembly of FIGS. 3A and 3B, and FIG. 4B is a plan view illustrating the speaker box assembly of FIG. 4A that has been closed with lid 401. As shown in FIG. 4A, speaker box assembly 401 may include speaker box 311 (with opposing speaker box walls 317 and 323), loudspeakers 101a-b (with speaker membranes 301a-b, permanent magnets 303a-b, enclosures 325a-b, and coils 304a-b), and antenna 131 as discussed above with respect to FIGS. 3A and 3B. Moreover, speaker box 311 may define acoustic back volumes 315a and 315b that are separated by interior wall 407. Accordingly, speaker box 311 may be formed (e.g., using injection molding), and antenna 131 and loudspeakers 101a-b may be bonded thereto. Once loudspeakers 101a-b have been bonded to speaker box wall 317, lid 403 may be secured to speaker box 311 (e.g., using screws 409) to thereby close acoustic back volumes 315a-b. Moreover, lid 403 may include openings 405a-b that are acoustically coupled to acoustic front volumes of loudspeakers 101a-b (defined by loudspeaker enclosures 325a-b). Openings 405a-b may thus be configured to provide acoustic coupling between acoustic front volumes of loudspeakers 101a-b and openings through housing 201 (e.g., openings 241a-b) of a finally assembled electronic device.

According to some embodiments of the present invention, acoustic back volumes 315a-b may thus be sealed using lid 403 before subsequent assembly into housing 201. According to other embodiments of the present invention, acoustic back volumes 315a-b may remain open until after assembly into housing 201 with portions of housing 201 providing sealing of acoustic back volumes 315a-b. In either case, speaker box assembly 401 (including speaker box 311, loudspeakers 101a-b, and antenna 131) may be assembled as a unit separate from housing 210 and separate from PCB 305.

According to some embodiments of the present invention, electronic device 101 may thus include printed circuit board 305, speaker box 311, and loudspeakers 101a-b. The a speaker box 311 may define acoustic volumes 315a-b between spaced apart speaker box walls 317 and 323, and speaker box wall 317 may be between speaker box wall 323 and printed circuit board 305. Loudspeakers 101a-b may be coupled to speaker box wall 317, and each of loudspeakers 101a-b may include an acoustic actuator (having a movable coil 304a-b and a stationary permanent magnet 303a-b) that is configured to generate displacements in response to an electrical signal applied thereto. Each loudspeaker 101a-b may also include a speaker membrane 301a-b that is mechanically coupled to a movable coil 304a-b of a respective acoustic actuator and that is configured to deflect in directions toward and away from the second speaker box wall responsive to displacements of coil 304a-b of the respective acoustic actuator.

As shown in FIGS. 3A and 3B, the acoustic actuators (including magnets 303a-b and coils 304a-b) and loudspeaker membranes 301a-b may be provided in speaker box 311 between speaker box walls 317 and 323. Moreover, speaker box 311 may include electrical couplings therethrough between coils 304a-b of the acoustic actuators and printed circuit board 305 so that coils 304a-b of the acoustic actuators are configured to generate displacements in response to electrical signals provided from printed circuit board 305 through the electrical couplings to the acoustic actuators. The electrical couplings, for example, may be provided through electrically conductive paths on/in PCB 305, through female connectors 383a-b, through male connectors 381a-b, through loudspeaker enclosures 325a-b, and along speaker membranes 301a-b to coils 304a-b.

Wireless transceiver 115 (including a transmitter and a receiver) and controller 111 may be implemented using one or more of integrated circuit electronic devices 321 and/or other electronic elements on PCB 305. Wireless transceiver 115 may be configured to transmit and receive wireless communications from a remote electronic device, and controller 111 may be configured to process the communications transmitted to and received from the remote electronic device. Moreover, antenna 131 may extend along speaker box wall 317 so that acoustic volumes 315a-b are between portions of antenna 131 and speaker box wall 317. As discussed above, housing 201 may define ends 208a-b, and housing 201 may enclose printed circuit board 305, speaker box 311, loudspeakers 101a-b, wireless transceiver 115, controller 111, and antenna 131. Moreover, speaker box 311 and antenna 131 may both be adjacent end 208a of housing 201 most distant from ear speaker opening 233. Microphone 231 may be adjacent end 208a of housing 201 and electrically coupled to controller 111. Moreover, microphone 123 may be configured to convert sound into an electrical signal to be processed by controller 111 and transmitted by transceiver 115, and microphone 131 may be acoustically coupled to microphone opening 231 through the housing 201. Ear speaker 121 may be provided adjacent end 208b of housing 201 and may be electrically coupled to controller 111. Moreover, ear speaker 121 may be configured to convert an electrical signal from controller 111 into sound with speaker being acoustically coupled to opening 233 through housing 201.

Acoustic volumes 315a-b may provide acoustic back volumes for loudspeakers 10la-b between loudspeaker membranes 301a-b and speaker box wall 323. Moreover, each loudspeaker 101a-b may include a respective enclosure 325a-b defining acoustic front volumes 327a-b between loudspeaker membranes 301a-b and speaker box wall 317 so that loudspeaker membranes 301a-b are between respective front and back acoustic volumes 327a-b and 315a-b. Enclosures 325a-b may define respective ports 329a-b coupled to acoustic front volumes 327a-b with ports 329a-b being configured to transmit sound generated by the loudspeaker. Moreover, ports 329a-b may be acoustically coupled with openings 342a-b and/or 341a'-b' through housing 201. As further shown in FIGS. 3A and 3B, speaker box wall 317 may be oriented in a direction that is substantially perpendicular with respect to the printed circuit board 305, and loudspeaker membranes 301a-b may be configured to deflect in a direction that is substantially parallel with respect to a major surface of printed circuit board 305.

According to other embodiments of the present invention, a speaker assembly may be assembled separately from printed circuit board 305 and housing 201. In particular, the speaker assembly may include speaker box 311, loudspeakers 101a-b, and antenna 131. Speaker box 311 may define acoustic back volumes 315a-b between spaced apart speaker box walls 317 and 323, and loudspeakers 101a-b may be coupled to speaker box wall 317. More particularly, loudspeakers 101a-b may include respective speaker membranes 301a-b configured to deflect in directions toward and away from the speaker box wall 317. Antenna 131 may be provided on the speaker box wall 323 so that acoustic front volumes 315a-b are between antenna 131 and speaker box wall 317. The speaker assembly can thus be used for different electronic devices (e.g., for different models of radiotelephones) thereby reducing time/cost to develop/tune/manufacture speakers and antennas for new products. Stated in other words, new products may be developed around a speaker assembly provided according to some embodiments of the present invention, with dimensions of the speaker assembly providing suitable loudspeaker and antenna performance.

After providing the speaker assembly including speaker box 311, loudspeakers 101a-b, and antenna 131, the speaker assembly may be assembled in housing 201 together with printed circuit board 305 so that speaker box wall 317 is between speaker box wall 323 and printed circuit board 305. More particularly, male connectors 381a-b of the speaker assembly may be connected with female connectors 383a-b of PCB 305, and the speaker assembly and PCB 305 may be enclosed within housing 201. The speaker assembly may thus be used with different electronic devices provided that housings and printed circuit boards of the different electronic devices are compatible with outside dimensions, ports, electrical connectors of the speaker assembly.

In the drawings and specification, there have been disclosed examples of embodiments of the invention and, although specific terms are employed, they are used in a generic and descriptive sense only and not for purposes of limitation, the scope of the invention being set forth in the following claims.

That which is claimed is:

1. A wireless communication device comprising:
a printed circuit board;
a speaker box defining an acoustic volume between spaced apart first and second speaker box walls wherein the first speaker box wall is between the second speaker box wall and the printed circuit board in a direction parallel with respect to a major surface of the printed circuit board, wherein the major surface is non-parallel with respect to the first and second speaker box walls;
a loudspeaker coupled to the first speaker box wall, wherein the loudspeaker includes an acoustic actuator that is configured to generate displacements in response to an electrical signal applied thereto, and wherein the loudspeaker further includes a speaker membrane that is mechanically coupled to the acoustic actuator and that is configured to deflect in directions toward and away from the second speaker box wall responsive to displacements of the acoustic actuator, wherein the acoustic actuator is configured to generate displacements along the direction parallel with respect to the major surface of the printed circuit board, wherein the printed circuit board is electrically coupled to the loudspeaker;
a wireless transmitter and/or receiver configured to transmit and/or receive wireless communications from a remote electronic device;
a controller electrically coupled to the wireless transmitter and/or receiver wherein the controller is configured to process the communications transmitted to and/or received from the remote electronic device; and
an antenna electrically coupled to the wireless transmitter and/or receiver, wherein the antenna extends along the second speaker box wall so that the acoustic volume is between portions of the antenna and the first speaker box wall.

2. A wireless communication device according to claim 1 wherein the acoustic actuator and the loudspeaker membrane are provided in the speaker box between the first and second speaker box walls in the direction parallel with respect to the major surface of the printed circuit board.

3. A wireless communication device according to claim 2 wherein the speaker box includes an electrical coupling therethrough between the acoustic actuator and the printed circuit board so that the acoustic actuator is configured to generate displacements in response to the electrical signal that is provided from the printed circuit board through the electrical coupling to the acoustic actuator.

4. A wireless communication device according to claim 1 wherein the wireless transmitter and/or receiver comprises a wireless transceiver configured to transmit and receive radiotelephone communications, the electronic device further comprising:
a housing defining first and second ends and enclosing the printed circuit board, the speaker box, the loudspeaker, the wireless transceiver, the controller, and the antenna, wherein the speaker box and the antenna are adjacent the first end of the housing;
a microphone adjacent the first end of the housing and electrically coupled to the controller wherein the microphone is configured to convert sound into an electrical signal to be processed by the controller and transmitted by the transceiver, and wherein the microphone is acoustically coupled to a first opening through the housing; and
a speaker adjacent the second end of the housing and electrically coupled to the controller wherein the speaker is configured to convert an electrical signal from the controller into sound and wherein the speaker is acoustically coupled to a second opening through the housing.

5. A wireless communication device according to claim 1 wherein the acoustic volume comprises a first acoustic volume between the loudspeaker membrane and the second speaker box wall, wherein the loudspeaker further includes an enclosure defining a second acoustic volume between the loudspeaker membrane and the first speaker box wall so that the loudspeaker membrane is between the first and second acoustic volumes, wherein the enclosure defines a port coupled to the second acoustic volume wherein the port is configured to transmit sound generated by the loudspeaker, the electronic device further comprising:
a housing enclosing the printed circuit board, the speaker box, and the loudspeaker, wherein the port is acoustically coupled to an opening through the housing.

6. A wireless communication device according to claim 1 wherein the acoustic volume is an acoustic back volume, wherein the first speaker box wall is oriented in a direction that is substantially perpendicular with respect to the major surface of the printed circuit board, and wherein the loudspeaker membrane is configured to deflect in a direction that is substantially parallel with respect to the major surface of the printed circuit board, and wherein the loudspeaker membrane is between the second speaker box wall of the acoustic volume and the printed circuit board in the direction parallel with respect to the major surface of the printed circuit board.

7. A method of assembling a wireless communication device, the method comprising:
  providing a speaker assembly including a speaker box defining an acoustic volume between spaced apart first and second speaker box walls, and a loudspeaker coupled to the first speaker box wall wherein the loudspeaker includes a speaker membrane configured to deflect in directions toward and away from the second speaker box wall, wherein the speaker assembly includes an antenna on the second speaker box wall so that the acoustic volume is between the antenna and the first speaker box wall; and
  after providing the speaker assembly including the speaker box and the loudspeaker, assembling the speaker assembly in a housing together with a printed circuit board so that the first speaker box wall is between the second speaker box wall and the printed circuit board in the direction parallel with respect to a major surface of the printed circuit board, and wherein the acoustic actuator is configured to generate displacements along the direction parallel with respect to the major surface of the printed circuit board, wherein the printed circuit board is electrically coupled to the loudspeaker, and wherein the major surface is non-parallel with respect to the first and second speaker box walls.

8. A method according to claim 7 wherein the loudspeaker includes an acoustic actuator that is configured to generate displacements in response to an electrical signal applied thereto with the acoustic actuator being mechanically coupled to the speaker membrane so that displacements of the actuator result in deflections of the speaker membrane in the directions toward and away from the second speaker box wall.

9. A method according to claim 7 wherein the acoustic actuator and the loudspeaker membrane are provided in the speaker box between the first and second speaker box walls.

10. A method according to claim 9 wherein the speaker box includes an electrical coupling therethrough configured to provide an electrical coupling between the acoustic actuator and the printed circuit board so that the acoustic actuator is configured to generate displacements in response to the electrical signal that is provided from the printed circuit board through the electrical coupling to the acoustic actuator.

11. A method according to claim 7 wherein the acoustic volume comprises a first acoustic volume between the loudspeaker membrane and the second speaker box wall, wherein the loudspeaker further includes an enclosure defining a second acoustic volume between the loudspeaker membrane and the first speaker box wall so that the loudspeaker membrane is between the first and second acoustic volumes, wherein the enclosure defines a port coupled to the second acoustic volume wherein the port is configured to transmit sound generated by the loudspeaker, and wherein the housing has an opening therethrough acoustically coupled with the port.

12. A method according to claim 7 wherein the acoustic volume is an acoustic back volume, wherein after assembling the speaker assembly in the housing, the first speaker box wall is oriented in a direction that is substantially perpendicular with respect to a major surface of the printed circuit board so that the loudspeaker membrane is configured to deflect in a direction that is substantially parallel with respect to the major surface of the printed circuit board wherein the loudspeaker membrane is between the second speaker box wall of the acoustic back volume and the printed circuit board in the direction parallel with respect to the major surface of the printed circuit board.

* * * * *

UNITED STATES PATENT AND TRADEMARK OFFICE
CERTIFICATE OF CORRECTION

PATENT NO.        : 8,260,343 B2                                    Page 1 of 1
APPLICATION NO.   : 12/332774
DATED             : September 4, 2012
INVENTOR(S)       : Eaton et al.

It is certified that error appears in the above-identified patent and that said Letters Patent is hereby corrected as shown below:

In the Patent:
Column 5, Line 66:

Please correct "Elements of controller 11, transceiver 115,"
        to read -- Elements of controller 111, transceiver 115, --

Signed and Sealed this
Twenty-second Day of January, 2013

David J. Kappos
*Director of the United States Patent and Trademark Office*